(12) United States Patent
Hsu

(10) Patent No.: US 7,602,405 B2
(45) Date of Patent: Oct. 13, 2009

(54) MULTIPLE BRUSH COMPONENTS

(75) Inventor: Siu Chi Hsu, Hong Kong (CN)

(73) Assignee: Microsoft Corporation, Redmond, WA (US)

( * ) Notice: Subject to any disclaimer, the term of this patent is extended or adjusted under 35 U.S.C. 154(b) by 418 days.

(21) Appl. No.: 11/276,905

(22) Filed: Mar. 17, 2006

(65) Prior Publication Data
US 2007/0216684 A1    Sep. 20, 2007

(51) Int. Cl.
*G09G 5/00* (2006.01)
(52) U.S. Cl. .................. 345/629; 345/418; 345/441; 345/630
(58) Field of Classification Search .................. 345/418, 345/581, 589, 619, 629; 715/700, 764, 781; 717/100, 106, 109
See application file for complete search history.

(56) References Cited

U.S. PATENT DOCUMENTS

| | | | | |
|---|---|---|---|---|
| 5,767,860 A * | 6/1998 | Zimmer et al. | ............... | 345/441 |
| 5,835,086 A * | 11/1998 | Bradstreet et al. | ........... | 345/581 |
| 5,999,190 A * | 12/1999 | Sheasby et al. | ............. | 345/589 |
| 6,011,536 A * | 1/2000 | Hertzmann et al. | ......... | 345/418 |
| 6,310,622 B1 * | 10/2001 | Asente | ........................ | 345/441 |
| 6,317,142 B1 * | 11/2001 | Decoste et al. | .............. | 715/762 |
| 6,373,490 B1 * | 4/2002 | Bendiksen et al. | .......... | 345/441 |
| 6,456,297 B1 * | 9/2002 | Wilensky | ..................... | 345/619 |
| 6,919,893 B2 * | 7/2005 | Tobita et al. | ................. | 345/473 |
| 6,970,169 B1 * | 11/2005 | Harris | ......................... | 345/440 |
| 7,079,153 B2 * | 7/2006 | Derry et al. | .................. | 345/594 |
| 7,236,180 B2 * | 6/2007 | Dresevic et al. | ............. | 345/592 |
| 2002/0085003 A1 * | 7/2002 | Nagashima | .................. | 345/441 |
| 2003/0107558 A1 * | 6/2003 | Bryborn et al. | .............. | 345/179 |
| 2004/0196295 A1 * | 10/2004 | Derry et al. | .................. | 345/594 |

* cited by examiner

*Primary Examiner*—Xiao M Wu
*Assistant Examiner*—Abderrahim Merouan

(57) ABSTRACT

In a brush tool of an electronic graphics design application, a single composite brush may include one or more brush components which are applied to the same stroke trail defined by a single pen down and pen up event. An interaction operation of the brush component(s) may be indicated such as merging of individual brush component stamps and/or trails of the brush components. A merging operator may define the composite brush component interaction which may be additive (e.g., a union), or subtractive (e.g., an intersection or a cutaway). The interaction may define the order of application of the merging operator to the brush components marks, such as sequential, hierarchical, and the like.

18 Claims, 10 Drawing Sheets

600

MULTIPLE BRUSH COMPONENTS

BACKGROUND

Many electronic graphics design applications allow a user to paint one or more brush strokes with a pixel paintbrush tool. A typical graphics design application generates the effect of a real-world paint brush with a rubber-stamp process. For example, a mask or template of the brush provides the outline of a single stamp. As the user indicates the stroke trail, a stamp defined by a brush mask is repeatedly applied along the trail and filled with the indicated coloring to create the appearance of a brush stroke. There are also other non-rubber stamp based methods, e.g. a watercolor diffusion simulation or a skeleton based stroking process, for generating the appearance of paint brush strokes on digital surfaces.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Creating a graphics design with an electronic graphics design application may require one or more brushes, with different brushes having different painting characteristics, such as smoothness, graininess, splattering, color, brush shape variability and other attributes that allow users to create brush marks with different expressions. It is desirable to have as many brush choices available to users as possible and that such brushes are user definable with various painting properties, such as mask shape, color, opacity and the like, adjustable by the user. However, the types of brushes created from a combination such an array of properties may still lack a desired richness because of the single valued nature of such properties. The richness and variability of brushes may be significantly extended by allowing multiplicity to such properties. Such multiplicity may be achieved by defining a brush as a collection of brush components, each brush component defined by an array of user adjustable brush component properties, combined together by a set of operators (defining the interaction between brush components) into the final composite brush. Thus, a single composite brush may include one or more brush components which are applied to the same stroke trail defined by the pen movement between a single pen down and pen up event. The single composite brush may, in one example, have one or more properties based upon two or more brush components, with each brush component comprising one or more different brush component properties, such as color, opacity, mask, bristling, paint thickness, and the like. While the following description mainly uses a rubber-stamp based approach in the examples, the descriptions and claims are not restricted to rubber-stamp based processes, but may also be applied to other paint brush methods such as watercolor diffusion simulation and skeleton based stroking processes.

To determine a composite brush based on two or more brush components, a brush merging operator defining an interaction between the different brush components may be indicated. For example, the brush component interactions may be applied over the brush component marks (e.g., a portion of or the entire trail or, optionally in the case of a rubber-stamp based process, applied individually over each stamp in the trail). Additionally or alternatively, the interaction of the brush components may be additive (e.g., a union of the brush component marks), or subtractive (e.g., an intersection of the brush component marks, a cut-away of the of one or more brush components against another brush component), and the like.

As a brush includes a plurality of brush components, the interactions of different brush components may be indicated to and/or by the user. For example, the order of the displayed brush components may indicate the order of application of the brush components to the trail indicated by the user. Additionally or alternatively, one or more brush components may be formed as an interactive brush component group that may be indicated to interact with one or more other brush components or brush component groups, forming a hierarchy. Such combination of brush components with interaction operators and grouping, defines an algebra of brush components and a composite brush may be effectively defined by such a brush component algebra expression. The interaction operator between the brush component groups may be indicated with any appropriate icon, symbol, and the like, such as '+', '−', '∪' '∩', and the like.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a graphics design system, the system described is provided as an example and not a limitation. As those skilled in the art will appreciate, the present examples are suitable for application in a variety of different types of object editing systems.

Figure 1:
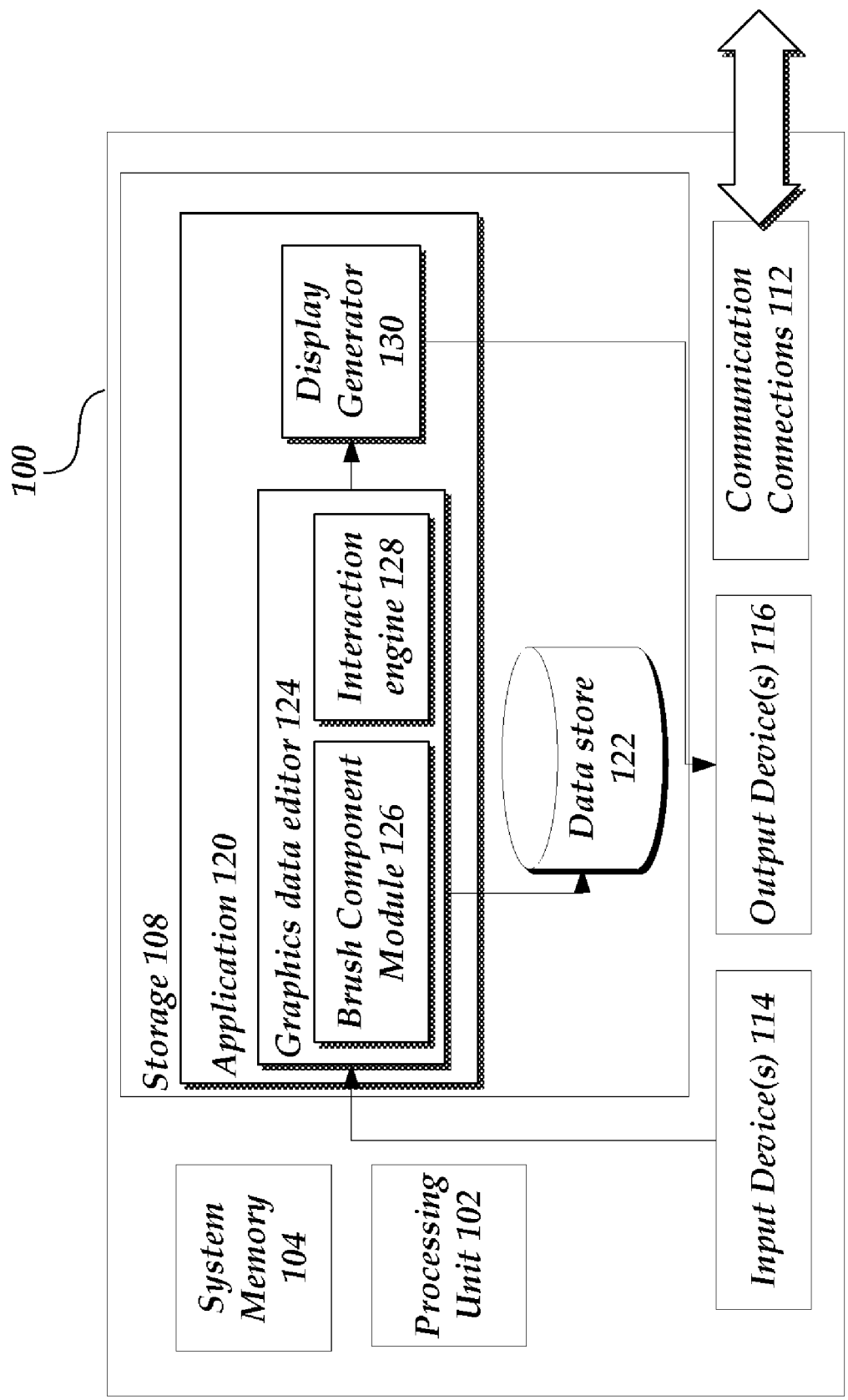
FIG. 1 is a block diagram of an example computing system for a graphics design system.

FIG. 1 and the following discussion are intended to provide a brief, general description of a graphics design system 100. As shown in FIG. 1, a graphics design system 100 may be provided by one or more computing devices 106. Computing device 106 of FIG. 1 and the following discussion are intended to provide a brief, general description of a suitable computing environment in which all or a portion of a graphics design system may be implemented. The operating environment of the computing device 106 of FIG. 1 is only one example of a suitable operating environment and is not intended to suggest any limitation as to the scope of use or functionality of the operating environment. Other well known computing systems, environments, and/or configurations that may be suitable for use with a graphics design system 100 described herein, include, but are not limited to, personal computers, server computers, hand-held or laptop devices, multiprocessor systems, micro-processor based systems, programmable consumer electronics, network personal computers, mini computers, mainframe computers, distributed computing environments that include any of the above systems or devices, and the like.

In its most basic configuration, computing device 106 typically includes at least one processing unit 102 and memory 104. Depending on the exact configuration and type of computing device, memory 104 may be volatile (such as RAM), non-volatile (such as ROM, flash memory, etc.) or some combination of the two.

Additionally, device 106 may also have additional features and/or functionality. For example, device 106 may also include additional storage 108 (e.g., removable and/or non-removable). Computer storage media includes volatile and nonvolatile, removable and non-removable media implemented in any method or technology for storage of information such as computer readable instructions, data structures, program modules, or other data. Memory 104 and storage 108 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 106. Any such computer storage media may be part of memory 104 and/or storage 108.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Device 106 may contain one or more communication connection(s) 112 that allow the device 106 to communicate with other devices, such as with other computing devices through a network (not shown). Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 106 may have one or more input device(s) 114 such as keyboard, mouse, pen, stylus, voice input device, touch input device, laser range finder, infra-red cameras, video input devices, and/or any other input device. Output device(s) 116 such as one or more displays, speakers, printers, and/or any other output device may be included.

Although not required, the graphics design system will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments.

The computing device 106 of the graphics design system may include one or more modules stored in any suitable manner, such as in the memory 104 and/or in the storage 108. As shown in the example of FIG. 1, the storage 108 may contain (or contain a reference to) modules for implementing the graphics design system such as a graphics design application 120 and a data store 122.

In the example of FIG. 1, the graphics design system may provide a graphics data editor 124, brush component module 126, interaction engine 128, and display generator 130. Although separate components are provided for the graphics data editor, brush component module, interaction engine, and display engine, it is to be appreciated that the graphics design application may provide any number of components in any format to provide the functionality discussed herein.

In one example, the graphics data editor 124 may provide a graphics data manipulation environment for manipulating graphics data such as pixel data, vector object data, and/or any other type of graphics data. The graphics data environment may provide any one or more of a graphic manipulation frame, graphics data editing tools, and the like. For example with reference to the example display 200 of FIG. 2, the graphics data editor may provide a frame 202 with a workspace 204 for creation and/or modification (i.e., manipulation) of pixel data. Although the examples discussed below illustrate composite brush components within a pixel editing environment, it is to be appreciated that a similar technique may be applied to vector object brush component data.

To allow manipulation of graphics data, the graphics data editor 124 may provide one or more graphics data editing tools and functionalities such as through a tool bar, toolbox, and/or palette which are tailored for editing graphics data. With reference to the example display 200 of FIG. 2, the pixel toolbox 206 may provide one or more selectable tools to generate and/or modify pixel data. One typical tool is a brush tool 214 which may allow a user to paint pixels or marks within the workspace over a defined trail. The trail may be defined in any appropriate manner, such as with a stylus or mouse indicator being dragged across the workspace. The trail may be defined with a pen down, pen movement, and pen up event, which includes click-hold, movement, and click-release events respectively.

In a pixel environment, the painting process applied by the brush tool may be defined by one or more pixel brush marks left by the brush tool along the trail to create the appearance of a brush stroke on a digital surface. In one example, the pixel painting process may be a 'rubber-stamp' process with brush marks (e.g., 'stamp' images) painted along the trail. While the following description mainly uses a rubber-stamp based approach in the examples, the descriptions and claims are not restricted to rubber-stamp based processes, but may also be applied to other paint brush methods such as watercolor diffusion simulation and skeleton based stroking processes.

The marks, spacing of stamps, color, and other properties of the brush component define the brush component. The brush tool 214 may provide one or more properties of each brush component applied along the trail. The brush component properties may be any suitable properties including any one more of a brush shape, brush size range, width variability, transparency variability, spacing, opacity, brush base rotation, brush rotation, paint rotation, max stamp repetition, jitter, hardness, roundness, initial slant, load image, grayscale masking, image partitions, stamp mode, and the like. The brush component properties may be sorted into those properties which define the placement of a mark or pixel of a brush component (e.g., brush shape, brush size range, width variability, spacing, brush base rotation, brush rotation, max stamp repetition, jitter, hardness, roundness, initial slant, grayscale masking, image partitions, stamp mode, and the like) and those properties which define the appearance or property of the mark itself, such as color (such as hue, lightness, saturation), load image, transparency variability, opacity, paint thickness, and the like). The value of one or more properties may dynamically change over the trail of a brush stroke such as transparency, width, mask shape, coloring, and the like. The one or more properties of a brush component may be modified by a user in any suitable manner, such as through menu options, a dialogue box, and the like.

The brush shape property defines the shape for the brush component mark, such as oval, bristle, image, block, and the like. The options for brush shape may be provided to the user through any suitable user interface such as through a drop down list, text input, radio buttons, and the like. For example, in the example display 200 of FIG. 2, the pixel toolbox 206 provides a brush component box 208 which indicates the shape of selected brush component mark with a shape indicator 210. The shape of the brush component may be changed by selecting, such as clicking on, the brush shape indicator and the pixel editor may sequence through the available brush shapes and/or provide a drop down box or other user interface device to allow a user to select the appropriate brush shape. In another example, in the example brush component property dialogue box 300 of FIG. 3, the brush shape indicator 302 is shown in text and may be changed with a drop down menu 304 and/or may be shown with a shape indicator 350.

Depending on the brush shape selected, one or more other brush component properties may be made available to the user. For example, with an oval brush shape, the roundness of the oval mask, the angle of the non-circular brush component, and the like may be adjusted. With a bristle brush shape selected, the number of bristles (e.g., points in the mask) may be adjusted such as through a text box, range slide, and the like. With an image brush shape, the brush component may use an indicated or default image or sequence of images as the brush mark image. If the image brush shape is selected, a load image selector may be provided to allow a user to upload one or more images to 'load' the brush component. If the block brush shape is selected, the brush component may 'paint' a non-aliased square or block of pixels in each brush mark across the trail.

The width variability determines whether the size of the brush mark may depend on any one or more of the stylus pressure at a particular point in the trail, location along the trail, location relative to a curve of the trail, and the like. If the width variability is activated, the pressure of the stylus in the workspace during creation of a trail may be used to create an internal brush mark mask having a width proportional to or based on the pressure of the stylus on the pad. If the width variability is not activated, then the brush mask may remain at a constant width which may be a default value and/or an indicated brush width value. For example, in the example dialogue box 300 of FIG. 3, the width variability 312 is not selected, and in response, the brush width may be defined by a default value or the maximum defined brush width 310.

The brush size range property defines the size variability of the brush mask when a pressure sensitive stylus is used to define the trail in the workspace, location along the trail, location relative to a curve of the trail, random variation, and the like. The brush size range provided by the user may be valued in any suitable manner, such as pixel width, and may be used to define the internal brush mark in response to received pressure from the stylus. The variability and range variability of the brush size range may be set in any suitable manner. For example, as shown in the example brush component property dialogue box 300 of FIG. 3, the brush size range 306 may be defined with a minimum value 308 and a maximum value 310.

Figure 3:
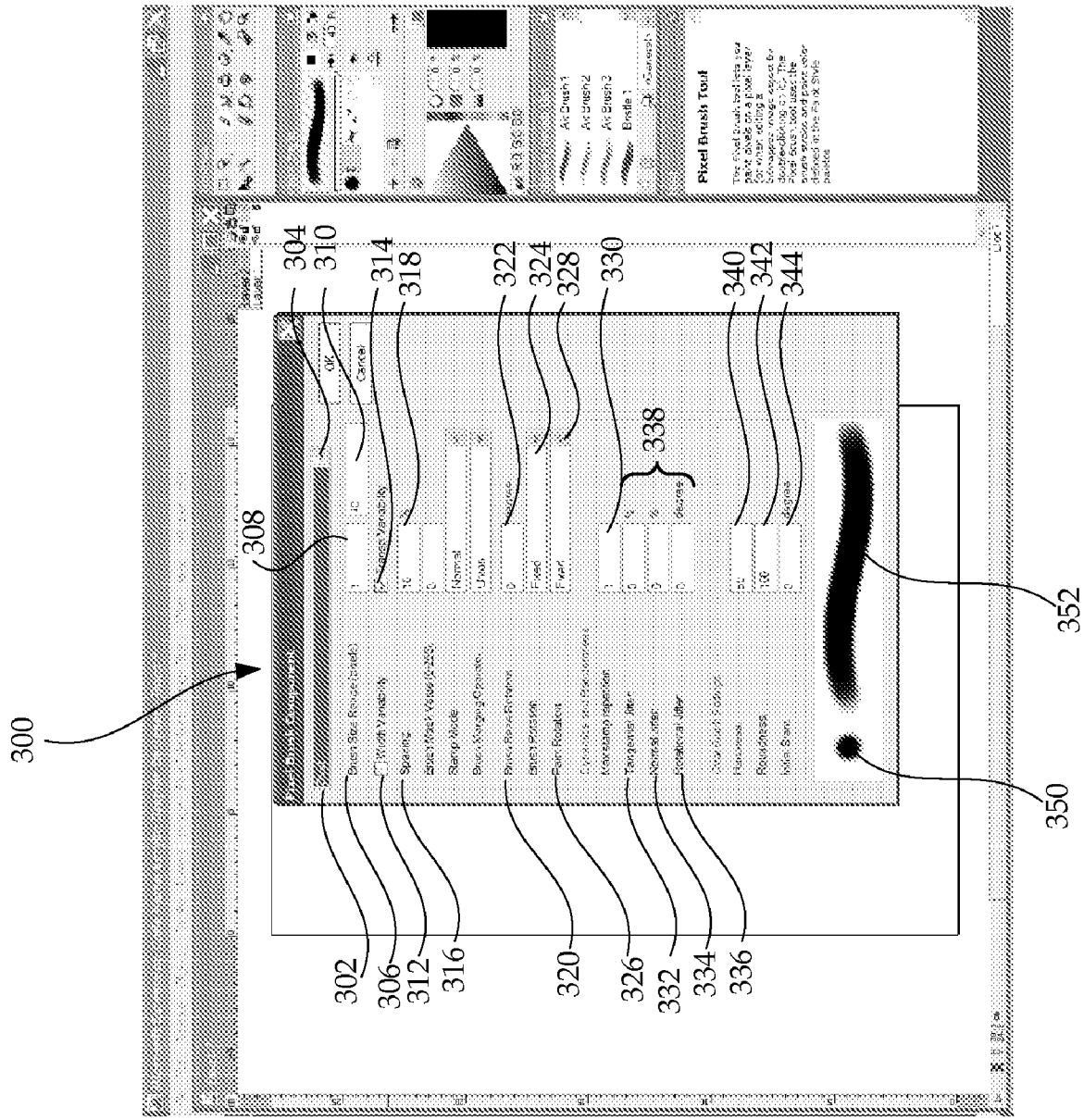
FIG. 3 is an example display of a brush component property dialogue box.

The transparency variability property defines the transparency of the brush mask when a pressure sensitive stylus is used to define the trail in the workspace, location along the trail, location relative to a curve of the trail, and the like. For example, the transparency of the mark applied may inversely vary relative to the received pressure of the stylus at that point in the trail. The transparency variability may be activated in any suitable manner, such as with a menu, radio button, check box 314 as shown in FIG. 3, and the like.

The spacing property defines the spacing between the brush marks such as 'stamps' of the mask along the indicated trail. If the spacing is set to be close together, the stamp images are placed close together may a smooth brush stroke effect may be achieved. If the spacing property is increased, the brush marks may be spaced out for a more stuttered or dashed effect. The spacing property may be defined and indicated in any suitable manner. For example, in the example dialogue 300 of FIG. 3, the spacing 316 may be defined through a text box 318 which may be in any suitable units such as a relative or percentage distance in terms of the actual size of the brush mark mask being used.

The opacity property determines the transparency value of that the brush component uses to paint onto the workspace. For example, a value of zero may indicate fully opaque and a value of 255 may indicate fully transparent. The opacity may be indicated and/or modified in any suitable manner and with any suitable user interface device. For example, in the example display 200 of FIG. 2, the opacity may be selected with the opacity slider 212.

The brush base rotation property defines an initial rotation to be applied to the brush shape. The brush rotation value may be indicated in any suitable manner. For example, as shown in the example dialogue 300 of FIG. 3, the brush base rotation 320 may be indicated with a text box 322 which allows a user to indicate an initial rotation in degrees.

The brush rotation property determines how the brush shape or mask rotates along with the brush trail. Options may be provided such as fixed or no rotation, follow tangent which follows the tangent of the trail, input device rotation based on rotation of a stylus or other input device rotation, and the like. The brush rotation may be indicated in any suitable manner such as with the drop down menu 324 of the example dialogue box 300 of FIG. 3.

The paint rotation property specifies how gradient paint and texture paint rotate along with the brush trail. Options may be provided in any suitable manner, such as those discussed above with respect to the brush rotation property. For example, as shown in FIG. 3, the paint rotation property 326 may allow a user to indicate the desired paint rotation with a drop down menu 328 offering options such as fixed, follow tangent, input device rotation, and the like.

The max stamp repetition property defines how many times the brush mark should be 'stamped' each time a brush mark is placed in accordance to the spacing. For example, the brush mark may be varied in each stamp placed. The mark used to stamp at a particular point in the trail may be determined based on a random number between 1 and the max stamp repetition. The max stamp repetition may be indicated in any suitable manner, such as through a text box 330 as shown in FIG. 3.

The jitter property defines an amount of random jitter to a brush stroke. One or more kinds of jitter may be defined. For example, as shown in FIG. 3, tangential jitter 332, normal jitter 334, and rotational jitter 336 may be provided through any suitable user interface device such as the respective text boxes 338. By increasing tangential jitter and normal jitter values, the 'stamped' image along the trail may be in a slightly different place than without jitter. For example, by setting the tangential jitter value to 20%, the brush mark may be placed randomly within a 20% distance off the indicated mark location either farther forward within the trail or farther backward within the trail. Setting the normal jitter value to 50 may place the brush mark within a 50% distance off the indicated mark location perpendicular to the trail. The rotational jitter value determines a random rotation of the brush mark which may be limited with a maximum value such as in degrees.

The hardness property determines the hardness of the edge of the brush shape. For example, a low value of hardness may create soft, feather edges of the brush mark mask and high values, such as 100 may result in little feathering. The hardness property value may be indicated by the user in any suitable manner, such as through the harness text box 340 of FIG. 3. The hardness property may be limited to particular types of brush shapes such as the oval brush.

The roundness property may determine the roundness of an oval brush in any suitable manner. For example, the roundness property value may determine the roundness of the oval as a ratio of the width of the oval relative to the height of the oval. For example, a roundness property value of 50 may determine that the oval will be half as tall as it is wide. A roundness value of 100 may mean that the oval is a circle. The roundness property may be indicated in any suitable manner, such as through the roundness text box 342 shown in FIG. 3.

The initial slant property determined the slant or rotation of an oval brush. For example, any oval brush mask that is not a circle (e.g., roundness of 100) may be slanted depending on the value of the initial slant property value. The initial slant property value may be indicated and/or changed in any suitable manner such as with the initial slant text box 344 of FIG. 3.

The load image property determines the image used to load an image brush shape. The grayscale masking property is used in an image brush selection to set the mask for the brush component as a grayscale mask. This allows specified paint settings to be applied to the image brush like other brush types. If this option is not selected, then the original color and transparency of the brush image are used and paint settings are be ignored. The image partitions property may be set to allow a portion of the image of the image brush to be used. If the image partition value is set to greater than 1, then the brush image may be split into an equal number of parts defined by the image partition value and a different image partition may be used as the brush mark or 'stamp' at a particular point in the trail. If the randomize box is disabled, then the image partitions may be cycled in order; if the randomize option is selected, then the partition for the stamp may be determined randomly from the available partitions, which may be limited by the maximum repetition property.

The brush marking mode property may determine how individual brush marks of the indicated brush component are combined when overlapped with the same or other marks of other brush strokes from the same brush component. The options of the brush marking mode may include one or more of normal mode, additive mode, multiply mode, and the like. The normal mode may combine the overlapping marks of the stroke by taking the maximum opacity at the overlapped area. The additive mode may combine the opacity in a way that more overlap will provide more opacity to the resulting composite mark. The multiply mode, similar to the additive mode, may increase the opacity but scaled by the spacing of the brush marks, giving the brush more room to build up the opacity.

Creating a graphics design may require one or more brush strokes, with different brush strokes having different brush component properties. However, as noted above, superimposing two or more separate brush strokes, such as to create a layering or interaction effect, may be difficult if the trail is complex and/or may not create the effect or brush component interaction desired by the user. Thus, a composite brush may be defined as a collection of one or more brush components, each brush component defined by an array of one or more user adjustable brush component properties, combined together by a set of merging operators (defining the interaction between brush components or onto a brush component) into the final composite brush. Thus, a single composite brush may include one or more brush components which are applied to the same stroke trail defined by the pen movement between a single pen down and pen up event. The single composite brush may, in one example, include two or more brush components, with each brush component comprising one or more different brush component properties, such as color, opacity, mask, bristling, and the like.

Figure 2:
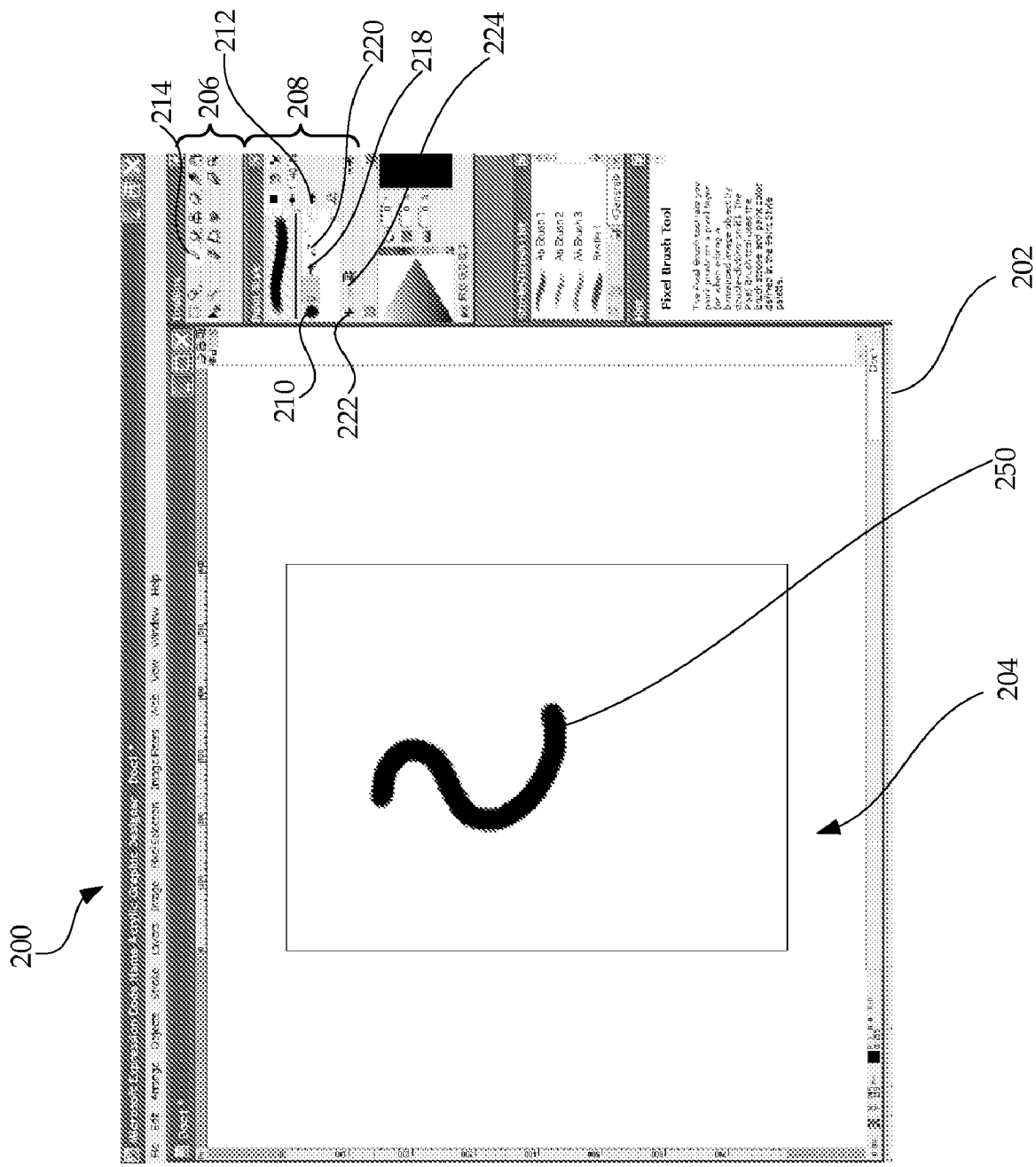
FIG. 2 is an example display of a pixel editing frame.

A user may define the multiple brush components and associated brush component properties of the single composite brush in any suitable manner. In the example display of FIG. 2, a user may select the brush tool 214 and may indicate one or more properties or accept the default properties of the indicated brush. As shown in FIG. 2, the indicated brush is an oval brush indicated by shape indicator 210 with a full opacity indicated by the opacity slider 212, no width variability as indicated with width variability selector 218, and opacity variability indicated with opacity selector 220.

The one or more properties of the brush component may be modified by the user in any suitable manner, such as by selecting or de-selecting one or more property indicators in the brush component box 208 and/or opening a brush component property dialogue box such as that shown in FIG. 3. If the user indicates a trail with a user input device, the user may paint a stroke onto the digital surface of the workspace 204 such as stroke 250 of FIG. 2.

To add an additional brush component to the indicated brush component of the brush tool, the user may indicate an additional brush component in any suitable manner. For example, as shown in the example display of FIG. 2, the user may select an additional brush component selector 222 which may automatically add a brush component to the composite brush of the brush tool, which may be indicated in the brush component box 208. Additionally or alternatively, the pixel editor may open a brush component dialogue box, such as that shown in FIG. 3 to allow the user to define the one or more properties for the additional brush component. In the example shown in FIG. 4, a user has selected the additional brush component selector 222 and presented with a brush component property dialogue box with default brush component properties. The user selected brush component properties identical to the first brush component except for the brush shape. In this example, the second brush component has a bristle shape property which is different from the oval shape property of the first brush component.

The additional brush component may be indicated to the user in any suitable manner. For example, a second brush component indicator may be displayed to the user such as within the brush component box 408 shown in FIG. 4. The additional brush component indicator may be any suitable indicator of an additional brush component. In the example display 400 of FIG. 4, the added brush component is displayed with a brush shape indicator 410, a width variability indicator 418, an opacity variability indicator 420, and the like. The additional brush component indicator may be displayed in addition or alternatively to the brush component indicator of the first brush component. For example, in the example display of FIG. 4, the second brush component indicator, such as indicators 410, 418, 420 are displayed in addition to the brush component indicators of the first brush component, e.g., brush shape indicator 210, width variability indicator 218, opacity variability indicator 218, and the like.

A brush component may be removed from the composite brush definition in any suitable manner. For example, a user may select the indicated or listed brush component and press a delete key on a keyboard input device, select a remove brush component selector such as remove selector 224 of FIG. 2, and the like.

In some examples, an interaction between the brush components in the single composite brush of the brush tool may be defined by an algebraic expression over one or more brush components with brush merging operators. The brush merging operators may be any suitable operation defining how the brush component marks are modified and/or merged together. One example of a binary brush merging operator on two brush components is the overlay operator which simply overlaps the marks of the second brush component onto those from the first brush component. One example of a unary operator on a single brush component is the inversion operator which inverts the color of the marks of the brush component operated upon. Any suitable binary and/or unary operators may be provided such as union, intersection, cut away, overlay, inversion, etc.

Figure 4:
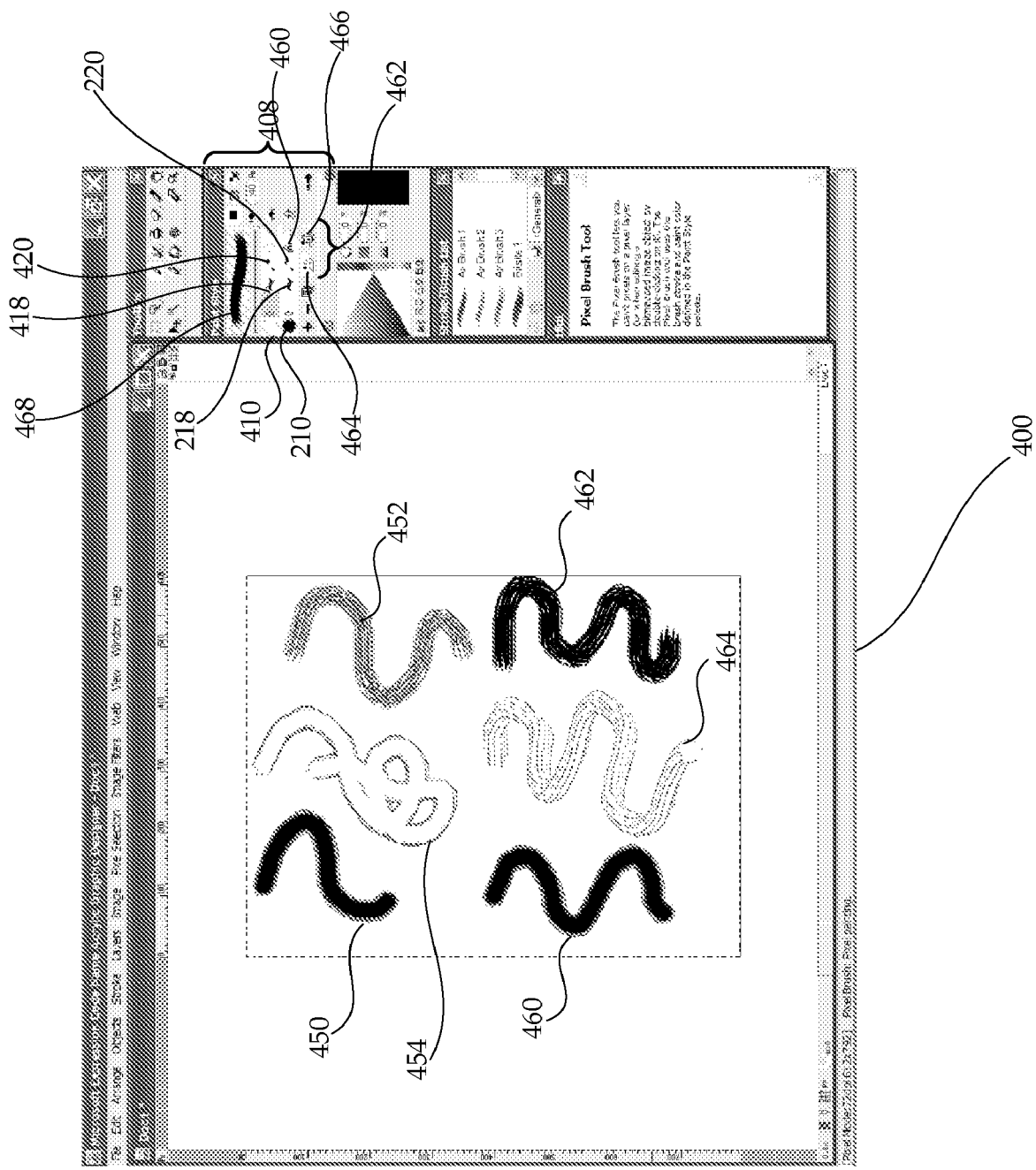
FIG. 4 is an example display of a multiple brush components in multiple brush strokes in the pixel editing frame of FIG. 2.

Because the brush merging operators are in general non-communicative in nature (e.g. the overlay operator), the definition of the interaction may include an ordering indicator indicating an order of application of the brush components. Any suitable ordering indicator may be displayed to and/or manipulated by the user to indicate the desired ordering of the brush merging operations. For example, a drop down menu may allow a user to indicate an ordering number for each brush component, a radio button may be provided to indicate the ordering number, a tree may be constructed to indicate order, and the like. In one example, the ordering indicator may be the listed order of the displayed brush component indicators themselves, with implicit or explicitly indicated brush merging operators between each consecutive pair of brush components. For example, the listing may start at the top of the list and work downwards through implicit or explicitly indicated brush merging operators. For example, if the implicit brush merge operator between a pair of brush components is assumed to be an overlay operation, the first listed brush component indicator may be 'painted' or marked first and the second listed brush component indicator may be marked second in the indicated trail to produce the combined marks. In another example, as shown in FIG. 4, the displayed vertical order of the listed brush component indicators may indicate the vertical order of the application of the brush component marks relative to the digital surface of the displayed workspace which is inherently at the 'bottom' of the listed brush components, i.e., from the bottom (or digital page) and work upwards. Specifically, the first brush component defined with brush shape 210 may be applied first since it is displayed below the second brush component defined by brush shape indicator 410. In this manner, the second brush component defined by brush shape indicator 410 may 'marked' on top of the first brush component defined by brush shape indicator 210, since the second brush indicator is displayed vertically on top of the first brush component indicator and if the merge operator is an overlay operation. Ordering of the brush component applications in the marking along the trail may allow different brush stroke effects to be created. The order of the listed brush components may be changed in any suitable manner. For example, clicking and dragging the brush component higher or lower in the list may change the brush component ordering. More elaborate and/or hierarchical ordering may also be specified, by using any suitable grouping or hierarchy indicators, such as indented lists, parentheses, tree views, and the like.

A brush merging operator of one or more brush components may define how the brush component properties and/or marks are to be modified and combined. For example, a brush merging operator may define whether the interaction is an overlaying of the second brush component mark on top of the first one in the case of an overlay operator; a union of the brush component arguments in the case of a union operator; an intersection of the brush component arguments in the case of an intersect operator; a cutting away of the second brush component mark from the first in the case of a cut away operator, an inversion of a single brush component mark, and the like.

The resulting properties of the composite brush properties and/or marks from the indicated merging operation may be determined through a combination of the input brush component transparencies/opacities, geometrical analysis of the mask shapes alone, and/or any other brush component properties. For example, the properties of each brush component may be merged to create the properties of the composite brush component. In another example, the marks (e.g., pixels) applied by each brush component may be merged in accordance to the merging operator(s) to determine the marks of the resulting composite brush component. Specifically, the marks of each brush component may be examined and the properties defining the appearance of each mark may be merged to its respective property defining the appearance of the mark of the other brush component. Example properties of a mark to be merged may include opacity, color, taint thickness, reflectivity, etc.

In merging the properties and/or marks of one or more brush brush components, a brush component algebra with brush merging operator may be defined to allow new complex brushes to be defined as brush component expressions. Such defined or intermediate composite brushes, might in turn be used as brush components to form new brush component expressions.

The overlay operation of two brush component marks may be accomplished in any suitable manner. For example, the alpha blending of the mark of the first brush component onto the mark of the second brush component may be used to compute the color and opacity of the composite brush mark. For other non-color component properties, like paint thickness, the composite brush component mark property value may be calculated in other suitable ways depending on the nature of the properties. In the case of the paint thickness property, the overlaying operator may sum up the paint thickness values of the input brush component marks, select the maximum paint thickness between the two brush components marks, use an average of the brush component marks, and the like. For example, if one particular pixel from a mark of the first brush component is denoted as (O1, C1, D1) where O1 is the opacity (as a percentage value), C1 is the non-premultiplied color value, and D1 is the paint thickness value, and another pixel from a mark of the second brush component is similarly denoted at the same pixel coordinates as (O2, C2, D2), then the corresponding pixel of the merged mark of the composite brush using the overlay operator may be defined as (O, C, D) where the opacity value (O), color value (C) and paint thickness value (D) may be computed using the overlay operator based at least in part on the opacity, color and paint thickness values of the first and second brush component marks. For example, the combination of the first and second brush mark property values to form the property value of the combined brush component mark may be a weighted sum of the first and second brush component mark property values. For example, the opacity of the combined brush component may be a complement of the product of the transparency values (the complement of the opacity values) of the first and second brush components, which may be represented as:

$$O=1-(1-O1)*(1-O2)=O1+O2*(1-O1) \quad (1)$$

In another example, the combination of the first and second brush property values may be combined using weights or other factors from other property values. For example, the color of the combined brush component mark may be a sum of the color values of the first and second brush component marks, with the color weighted by a weighting factor and/or the respective opacity of the first and second brush components. In one example, the color of the combined brush component may be represented as:

$$C=O1*C1+(1-O1)*O2*C2 \quad (2)$$

In another example, the combination of the first and second brush component property values may be combined using any suitable algorithm or deterministic manner, such as addition, multiplication, averaging, etc. For example, the paint thickness of the combined brush component mark may be a simple addition of the paint thickness values of the first and second brush components which may be represented as:

$$D=D1+D2 \quad (3)$$

While the above examples of the overlay merge operation describes three properties (i.e., opacity, color, and paint thickness) of the composite brush mark, the determination of one or more combined brush component properties and/or marks could be extended to any other additional and/or alternative properties with any suitable formulae.

The union operation of brush components may determine the combined brush component mark based at least in part on the pixel values of marks from the input brush component with the maximum opacity. For example, a union of the bristle and the oval shape brush components of the example of FIG. 4 may provide a brush stroke like stroke 450 or stroke 460. Another possible definition of the union operator may create the colors of the composite brush component mark by blending and weighting the colors of the input brush component marks based on the opacity of that brush component mark, rather than directly using the color values from the marks with the higher opacity. For example, if one particular pixel from the mark of the first brush component is denoted as (O1, C1, D1) where O1 is the opacity (as a percentage value), C1 is the non-premultiplied color value and D1 is the paint thickness value. Another pixel from the mark of the second brush component at the same pixel coordinates may be similarly denoted as (O2, C2, D2). The corresponding pixel of the merged mark using the union merge operator may be denoted as (O, C, D) where the opacity value (O), color value (C) and paint thickness value (D) may be computed based at least in part on the opacity, color and paint thickness values of the first and second brush components. For example, the opacity (O) of the combined brush component may be determined as the maximum opacity value of either the first and second brush component marks which may be represented as:

$$O=\text{Max}(O1, O2) \quad (4)$$

The color of the combined brush component mark may be determined in the union merging operation using any suitable combination of the color properties of the first and second input brush component marks, and may be based at least in part on one or more other property values of the first and second brush components. For example, the color of the combined brush component mark may be a weighted average of the color values of the first and second brush component marks and the opacities of the first and second brush component marks, which may be represented as:

$$C=(C1*O2+C2*O1)/(O1+O2) \quad (5)$$

The paint thickness of the mark of the combined brush component may be determined in the union merging operation in any suitable manner. For example, the paint thickness of the combined brush component mark may be determined in a manner similar to the opacity, e.g., the maximum of the associated paint thickness property values of the first and second brush component marks, which may be represented as:

$$D=\text{Max}(D1, D2) \quad (6)$$

While the above examples of the union merge operation describes a combination of three properties (i.e., opacity, color, and paint thickness) of the composite brush component mark, the determination of one or more combined brush component properties and/or marks could be extended to any other additional and/or alternative properties and/or marks with any suitable formulae.

The intersection of brush components as a merging operator may determine the combined brush mark based at least in part on the marks from the brush component with the maximum transparency (i.e., minimum opacity). For example, an intersection of the bristle and oval shape brush components of the example of FIG. 4 may provide a brush stroke such as stroke 452 or stroke 462 where the resulting composite brush mark is an intersection of the bristle brush stroke marks of the second brush component with the oval brush stroke marks of the first brush component. In stroke 452, since the buffer mode (discussed further below) was set to multi-buffer mode, the composite brush mark is determined as an intersection between the entire trail of the first brush component and the entire trail of the second brush component. In the example stroke 462, since the buffer mode (discussed further below) was set to single buffer mode, the composite brush mark is determined as an intersection of the stamp of the first brush component and the stamp of the second brush component at each stamp along the trail. Another possible definition of the intersection operator may instead of directly using the color values from the marks with the higher transparencies, blended colors based on the transparencies of the marks may be used instead. For example, if one particular pixel from the mark of the first brush component is denoted as (O1, C1, D1) where O1 is the opacity (as a percentage value), C1 is the non-premultiplied color value and D1 is the paint thickness value, and another pixel from the mark of the second brush component at the same pixel coordinates is denoted as (O2, C2, D2), then the corresponding pixel of the merged mark using the intersection operator may be denoted as (O, C, D). The opacity (O) of the combined brush component mark may be determined in the intersection merging operation as the minimum opacity of the first and second brush component marks which may be represented as:

$$O = \text{Min}(O1, O2) \qquad (7)$$

The color of the combined brush component mark may be determined in the union merging operation using any suitable combination of the color properties of the first and second input brush component marks, and may be based at least in part on one or more other property values of the first and second brush component marks. For example, the color of the combined brush component mark in the intersection merging operation may be a weighted average of the color values of the first and second brush component marks and the opacities of the first and second brush component marks, which may be represented as:

$$C = O1*C1 + (1-O1)*O2*C2 \qquad (8)$$

The paint thickness of the combined brush component mark may be determined in the intersection merging operation in any suitable manner. For example, the paint thickness of the combined brush component mark may be determined in a manner similar to the opacity, e.g., the minimum of the associated paint thickness property values of the first and second brush component marks, which may be represented as:

$$D = \text{Min}(D1, D2) \qquad (9)$$

While the above examples of the intersection merge operation describes intersecting three properties (i.e., opacity, color, and paint thickness) of the input brush component marks, the determination of one or more combined brush component properties and/or marks in an intersection merging operation could be extended to any other additional and/or alternative properties with any suitable formulae.

The cut away operation of brush components may use the opacities of the second brush component marks to scale down the opacities of the first brush component marks, which may create a scraping appearance. For example, one particular pixel from the mark of the first brush component may be denoted as (O1, C1, D1) where O1 is the opacity (as a percentage value), C1 is the non-premultiplied color value and D1 is the paint thickness value. Similarly another pixel from the mark of the second brush component at the same pixel coordinates may be denoted as (O2, C2, D2). In this manner, the corresponding pixel of the merged mark using the cut-away operator may be denoted as (O, C, D) where the opacity (O), color (C), and paint thickness (D) of the combined brush component are determined in any suitable manner based on the marks and/or other properties of the first and/or second brush components. For example, the opacity (O) of the composite brush component mark may be the opacity of the first brush component mark scaled by the transparency value (the complement of opacity value) of the second brush component mark, which in one example may be determined using:

$$O = (1-O2)*O1 \qquad (10)$$

The color of the combined brush component mark may be determined in the cut away merging operation using any suitable one or more of the color properties of the first and second input brush component marks. For example, the color of the combined brush component mark in the cut away merging operation may simply be left unchanged as the color of the first brush component mark, as long as the opacity values are appropriately adjusted to create the effect of a cut-away effect. Nonetheless, any other blending function for mixing the color values of the two brush components may also be employed to introduce subtle color bleeding effects. In one example, the color of the combined brush component mark may be the color of the first brush component mark, which may be represented as:

$$C = C1 \qquad (11)$$

The paint thickness of the combined brush component mark may be determined in the cut away merging operation in any suitable manner. For example, the paint thickness of the combined brush component mark may be determined as a selection between the paint thickness of either the first or second brush component marks. The selected brush component mark paint thickness may be selected to match the brush component mark providing the selected color, e.g., the second brush component as determined by Equation (11), or may be a maximum or determined combination of the associated paint thickness property values of the first and second brush component marks. In one example, the paint thickness of the combined brush component mark may be the maximum between a paint thickness of 0 and the difference between the paint thicknesses of the first and second brush components marks, which may be represented as:

$$D = \text{Max}(O, D1 - D2) \qquad (12)$$

While the above examples of the cut away merge operation describes merging three properties (i.e., opacity, color, and paint thickness) of the marks, the determination of one or more combined brush component properties and/or marks in a cut away merging operation could be extended to any other additional and/or alternative properties with any suitable formulae.

A resulting cut away of a bristle brush component on an oval brush component is shown in the example stroke 454 and example stroke 464 of FIG. 4. In example stroke 454, since the buffer mode (discussed further below) was set to multi-buffer mode, the composite brush mark is determined as the entire trail of the second brush component cutting away a portion of the entire trail of the first brush component. In the example stroke 464, since the buffer mode (discussed further below) was set to single buffer mode, the composite brush mark is determined as the stamp mark of the second brush component cutting away a portion of the stamp of the first brush component at each stamp along the trail.

The brush merging operator indicator may be any suitable indicator of the operator defining the interaction between the brush components and may be selectable by the user with an input device to modify the value of the brush merging operator. For example, as shown in the example display of FIG. 4, the brush merging operator between the first brush component and the second brush component is displayed with a brush merging indicator 460 with an outline of a paint drop. The brush merging indicator 460 displays the current mode of the merge operation between brush components with a symbol internal to the raindrop shape. For example, as shown in the example of FIG. 4, the brush merging indicator 460 contains a minus symbol (–) indicating that the brush merging operation has a cut-away mode. Similarly, the brush merging indicator may contain an intersection symbol (∩) indicating that the brush merging operation has an intersection mode. Similarly, the brush merging indicator may contain a union symbol (∪) indicating that the brush merging operation has a union mode. In another example, the brush merging operator may be a unary operator operating against a single brush component. For example, the brush component operator may indicate an inverse merging operation such as with a black and white (e.g. yin/yang symbol) to invert the color, mask, or other property(ies) of the input brush component.

To modify the mode of the brush merging operator, the pixel editor may provide any suitable user interface device such as a drop down menu, clicking of the displayed brush merging indicator to rotate through mode options, and the like. It is to be appreciated that any suitable combination of user interface device may be provided to the user to indicate the merge operation such as a text box, radio button, check box, other symbols and/or icons, and the like.

Figure 8:
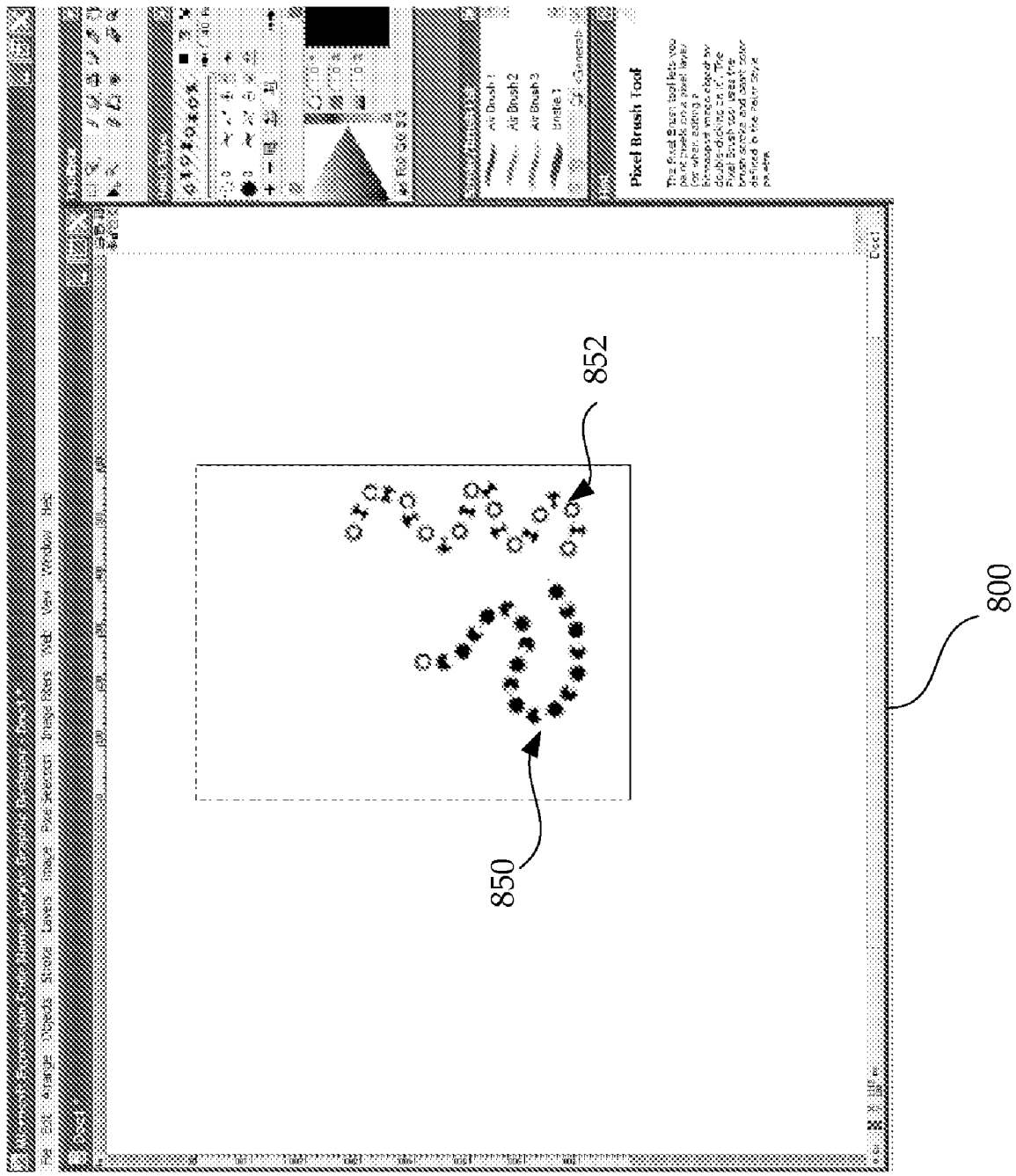
FIG. 8 is another example display of multiple brush components with both single buffer brushing and multi-buffer brushing.

The examples above describe an interaction between two brush components to form a single composite brush to be applied to a brush stroke. In some examples, any number and order of brush components may interact. In one example, each brush component may be applied sequentially in the indicated order. In the example display 800 of FIG. 8, three brush components (two oval shapes and one bristle shape) are used to create the example strokes 850 and 852, with single buffer brushing and multi-buffer brushing respectively. In both example strokes, the first brush component is an oval brush, the second brush component is a bristle brush which is a cut away of the first brush component, and the third brush component is an oval brush which is added to the cut away intermediate combination of the first and second brush components. The spacing of the brush component stamps has been extended to exaggerate the effects of the single and multi-buffer brushing results.

Figure 9:
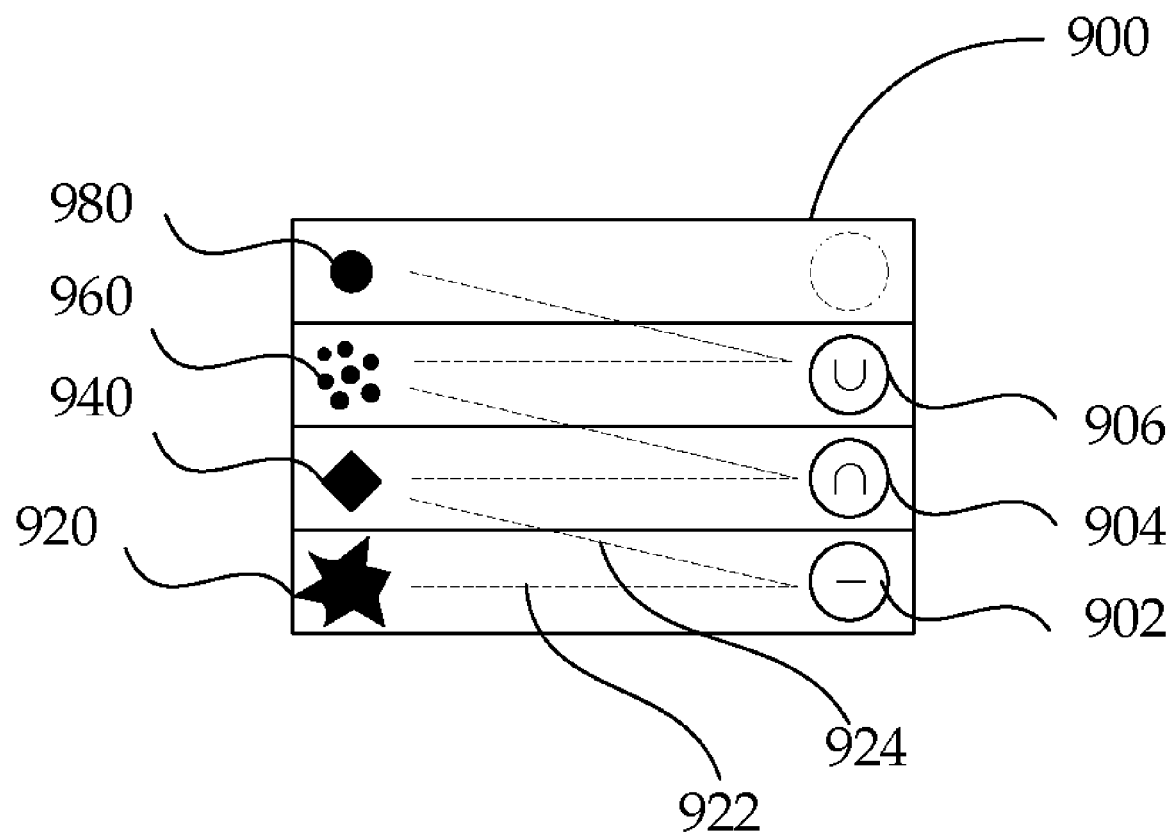
FIG. 9 is an example display of a user interface of input brush components and merging operators.

Another example display 900 of input brush components and merging operators is illustrated in FIG. 9. As shown in the example display of FIG. 9, the brush merging operator between the first brush component 920 and the second brush component 940 is displayed with a brush merging indicator 902. The brush merging indicator 902 displays the current mode of the cut away merge operation between brush components 920 and 940 with a minus symbol internal to a circle shape. The brush components associated with the brush merging operator, such as brush merging operator 902, may be inherently indicated such as by their relative placement to the brush merging operator indicator of may be explicitly indicated such as with lines 922, 924. In the example display 900 of FIG. 9, the brush merging operator 904 indicates an intersection merging operation between the second brush component 940 and the third brush component 960 with an intersection symbol (∩) and its relative placement between the brush component indicators 940, 960. The brush merging operator 906 indicates a union merging operation between the third brush component 960 and the fourth brush component 980 with a union symbol (∪) and its relative placement between the brush component indicators 960, 980.

To determine the combined brush component of the indicated three or more brush components, the graphics design application may combine the brush components in the indicated manner. For example, with reference to the example display of FIG. 9, the order of the application of the brush merging operators is inherently in the order of the listed brush merging operator indicators, i.e., from the bottom up; and the order of the application the brush components within a single brush merging operation is indicated in the listed order of the brush component indicators, i.e., from the bottom up. In this manner, the first two brush components may be combined in accordance with the first listed brush merging operator, and that result may then be combined with the next listed brush component in accordance with the next listed brush component merging operator. Thus, a hierarchy of brush merging operations and associated brush components may be created.

Figure 10:
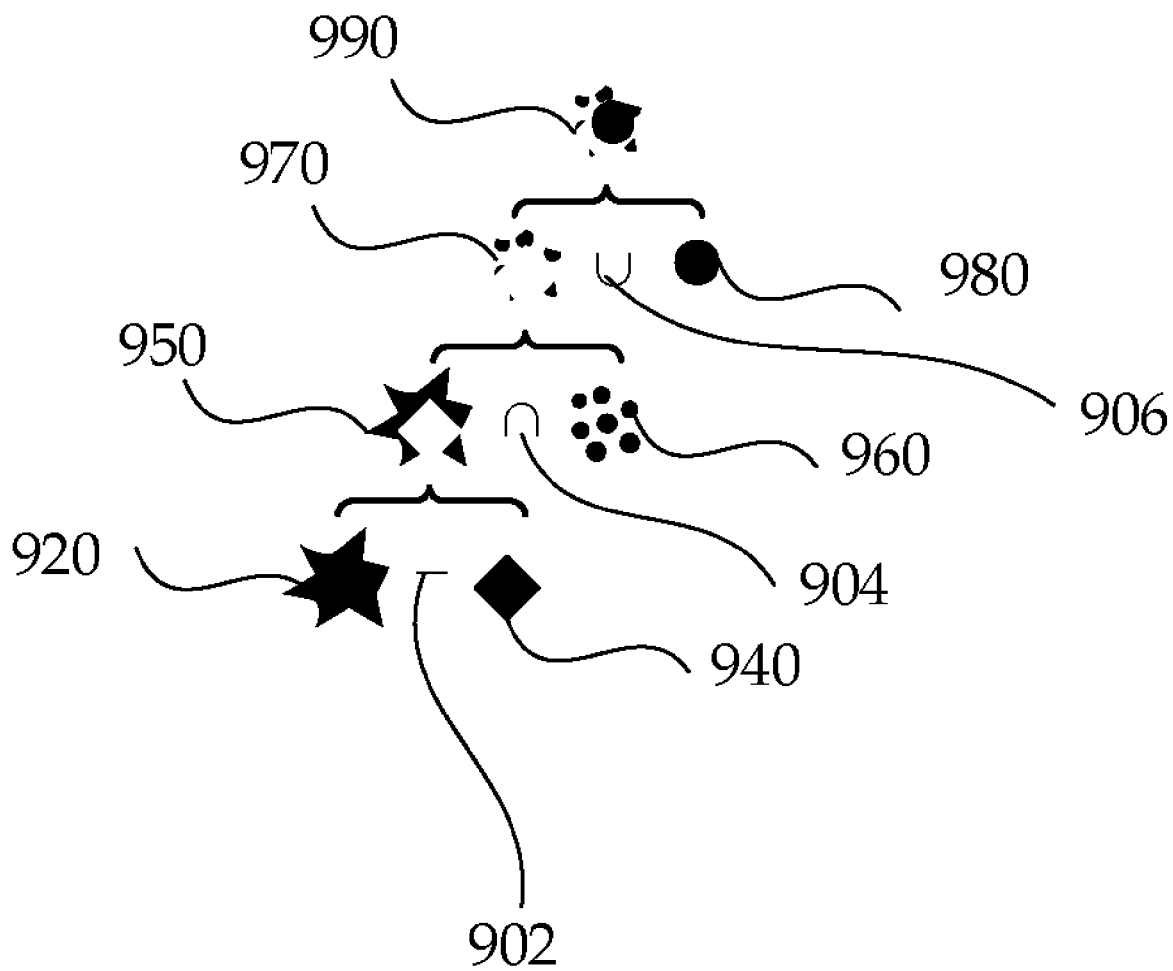
FIG. 10 is an example diagram of a hierarchy of brush component merging operations in accordance with the indicated brush components and brush components operators of FIG. 9.

FIG. 10 illustrates an example brush component merging hierarchy 1000 in accordance with the listed brush components and brush components operators of the example display 900 of FIG. 9. With reference to the example display 900 of FIG. 9 and the hierarchy of FIG. 10, the graphics design application may combine the brush component 920 with brush component 940 using the cut away merging operation indicated by the first listed brush merging operator 902, i.e., the second listed brush component 940 may be 'cut away' from the first listed brush component 940. In this manner, an intermediate combined brush component of brush components 920, 940 may result in an intermediate combined brush component, such as intermediate brush component 950 illustrated in the example brush component hierarchy 1000 of FIG. 10. The graphics design application may combine the intermediate brush component 950 with the next listed brush component 960 using the intersection merging operation indicated by the second listed brush merging operator 904, i.e., the third listed brush component may be intersected with the intermediate brush component 950. In this manner, a second intermediate brush component of brush components 950, 960 may result in an intermediate combined brush component, such as intermediate brush component 970 of FIG. 10. Following the inherent listed order, the graphics design application may combine the intermediate brush component 970 with the next listed brush component 980 using the union merging operation indicated by the third listed brush merging operator 906, i.e., the fourth listed brush component 980 may be unioned with the intermediate brush component 970. In this manner, a third brush component of brush components 970, 980 may result in the final combined brush component, such as intermediate brush component 990, since there are no more listed brush components to merge.

As noted above, the ordering of the application of the multiple brush components may be defined with an ordering indicator. In the example above with two brush components and the multiple brush components of FIG. 9, the ordering was sequential between the listed components. However, in some cases, a user may define a hierarchical order of brushes with the ordering indicator. For example, one or more brush components may be defined as a group and merged (as defined by the brush component interactions) to form a group combined brush component. This group combined brush component may then interact with one or more brush component groups, with each group containing one or more brush components and a brush merging operator may be indicated to define the merging of the group combined brush components. In the simplest case, each brush component group may contain a single brush component, which then resolves into the examples described above with two or more sequentially ordered brush components. In another example, a group may contain a single brush component, however, multiple group brush components may then be merged (as defined by the brush component interactions) to form the group combined brush component. The group combined brush components may then be combined in accordance with a brush merging operator to from the final combined brush component. In this manner, a hierarchy of brush components may define the group combined brush component. Such hierarchical ordering may allow complex brush component interaction like (B1∩B2)–(B3∪B4) to be defined, where B1, B2, B3, B4 denote indicated brush components. In another example, a brush component group may be defined as containing a plurality of brush components. These brush components may be merged together and then, their composite, may then be merged with other indicated brush component groups as indicated with the associated brush component interactions.

To form a brush component group containing a plurality of brush components, the graphics design application may provide any suitable user interface device to the user. For example, a user may select a plurality of brush components and then select a brush component grouping indicator indicating that the selected brush components are to be merged to form a group combined brush component before merging with one or more brush component groups. In this manner, the ordering indicator may include on or more component group indicators.

The interactions within and between different brush component groups may be indicated in any suitable manner. The interactions of multiple brush components within a brush component group may be indicated similar to that described above with respect to two or more single brush components, such as with the ordering indicator, brush merging indicator, the brush mask value indicator, the buffer merging indicator, and the like. The interaction between brush component groups may be indicated to and/or by the user and/or displayed to the user in any suitable manner. For example, additional indentations to components within a brush component group, an additional ordering indicator, brush group merging indicator, brush group mask value indicator, group buffer merging indicator, and the like may be provided for manipulation by and/or display to the user to indicate the interaction(s) between brush component groups. In another example, a brush component group may be indicated by a single composite brush component indicator which may be indicated to interact with one or more other brush components groups as described above with the ordering indicator, brush merging indicator, the brush mask value indicator, the buffer merging indicator, and the like. The composite brush component indicator may allow a user to access the individual brush components of the group in any suitable manner. For example, double clicking on the composite brush component indicator may allow the user to access and/or modify the individual brush components of that group by displaying the brush component indicators for that brush group. Accordingly, one or more brush components may be applied in order and with defined interactions in a group, and the resulting composite group brush interacting with one or more other brush component groups. Similarly, one or more brush component groups may then be grouped with defined interactions, and that meta-group composite brush may then interact with one or more other brush component groups. In this manner, a hierarchy of brush component groups may be defined for a single trail of an indicated stroke by a pixel brush tool.

Grouping of components to define order of more than two brush components may be analogous to parentheses in an algebraic expression. For example, a user may indicate an algebraic expression such as B1∩(B2+B3)–(B4+B5). In this manner, the graphics application may determine the group brush components delimited by the parentheses (e.g., brush component B2 unioned with brush component B3 to form group brush G1, and brush component B4 unioned with brush component B5 to form a group brush component G2). The expression may then be indicated as B1∩G1–G3, which then may be evaluated to determine the composite brush in sequential order starting from the left. It is to be appreciated that any number of brush components, interaction operators, and the like may be used to define the composite brush.

Since a stamp or brush mark of each brush component may dynamically change over the indicated trail (such as with width variability, transparency variability, randomness, jitter, and the like), the composite brush mark may also dynamically change over the length of the trail. As a result, the combination of the brush components into a composite brush may be different if applied at different times along the trail or even applied to the entire trail. In this manner, the interaction operator may include an indicator defining the timing (or geometric location along the trail) of the algebraic merging operations discussed above.

Figure 5:
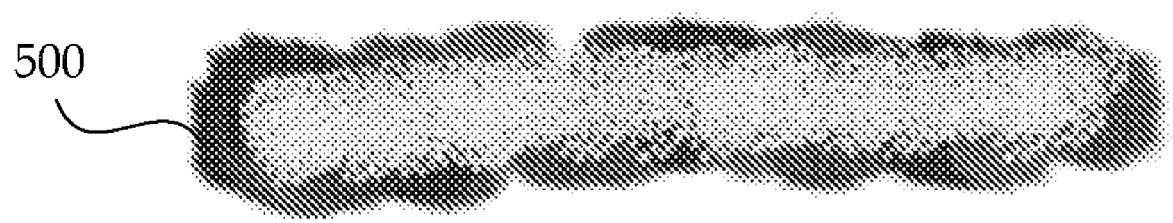
FIG. 5 is an example brush stroke of multi-buffer brushing of multiple brush components.
Figure 6:
FIG. 6 is an example brush stroke of single buffer brushing of multiple brush components.

In some examples, the timing of the application of the interaction between the different brush components may be indicated. More specifically, a buffer merging operator may indicated the set of marks to be merged as the array of marks in each stamp along a trail, as a portion of a trail of marks, the entire trail of marks, etc. In one example, the brush components may be merged into a composite brush at each mark (e.g., stamp) in an indicated trail. In another example, each brush component may apply its own individual stamp across the entire or a portion of the indicated trail, and then the two or more trails may be merged into the single composite brush stroke of the combined two or more brush components. Specifically, with multi-buffer brushing, the brush trail (or a portion of the brush trail) of each individual brush component is stored in memory (e.g., a buffer component such as memory 104 and/or storage 108 of FIG. 1), and then the marks of the trail merged together based on the brush merging indicator. In another example, with single buffer brushing, the brush shapes of each of the brush components are painted into one common buffer in sequence, with the stamps of each component interleaved and the marks of the pixel stamps are merged as soon as they are made along the trail in accordance with the brush merging indicator. Since some brush component property values, shapes, and the like may change over the length of a trail, the composite brush may be determined at each stamp of the composite brush (as defined by the spacing of the composite brush) along the trail in single buffer brushing mode. In the example stroke 500 of FIG. 5, the interaction was set as multi-buffer brushing and a bristle brush component is merged with an overlay operator on top of an oval brush component after the entire trail is determined. In another example, FIG. 6 illustrates an example stroke 600 where the interaction was set as a single buffer brushing where the bristle brush component is merged with an overlay operator on top of the oval brush component with each stamp within the trail, providing an interleaved effect of the stamps in the trail.

The application of a buffer merging interaction may be indicated to and/or by the user in any suitable manner through any suitable user interface device such as drop down menus, selectable icons, radio buttons, and the like. For example, similar to the brush merging indicator above, a single buffer brushing indicator may be provided and selection of the indicator may select and/or rotate through the one or more optional modes of buffer brushing. In another example, as shown in the example display 400 of FIG. 4, one or more buffer merging indicators 462 may be provided which may be selected by the user to indicate the mode of the buffer brushing. For example, the buffer merging indicator 464 illustrates an icon of the stamps joined together. If the buffer merging indicator 464 is selected, the mode of the buffer merge may be as a single buffer brushing. The buffer merging indicator 466 illustrates an icon of the stamps separated. If the buffer merging indicator 466 is selected, the mode of the buffer merge may be multi-buffer brushing. Selection of one of the buffer merging indicators 464, 466 may automatically deselect the other of the brush buffer merging indicators 466, 464 respectively.

An additional or alternative interaction may be a brush mask value property which determines the transparency value that the indicated brush component uses to paint onto the internal trail buffer. For example, a value of zero may indicate fully opaque and a value of 255 may indicate fully transparent. Although the brush mask value property can be used to control the opacity of the brush, it may be used for controlling the interaction with other brush components. For example, one brush component may be indicated as fully opaque and the next brush component may be partially transparent to create a 'wet brush' effect where the edge of the brush stroke is darker than the middle. In this manner, the different opacities of the multiple brush component marks may interact.

Figure 7:
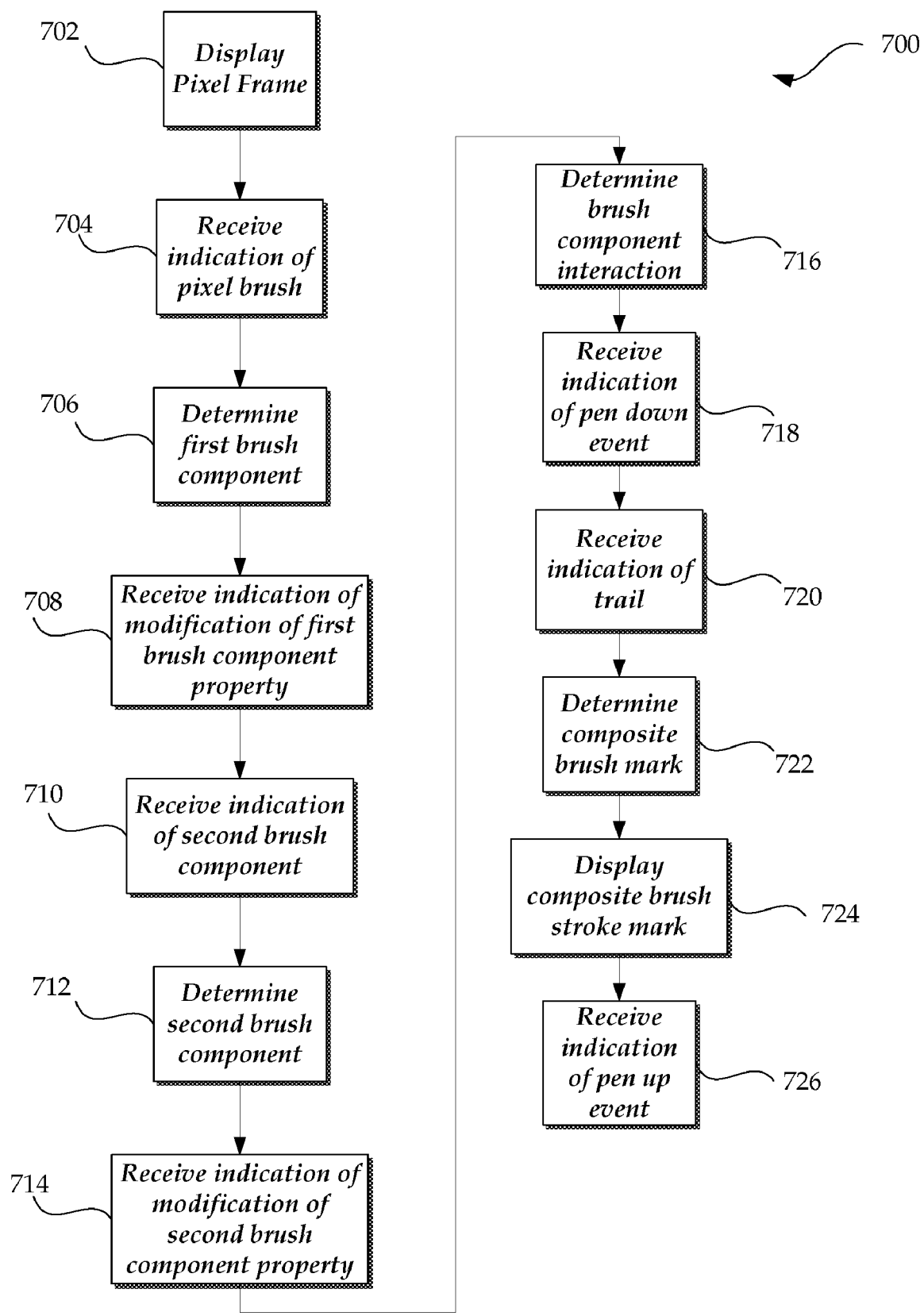
FIG. 7 is an example method of multiple brush components.

FIG. 7 illustrates an example method 700 for multiple brush components. In operation, a graphics design application, such as graphics design application 120 of FIG. 1, may display 702 a graphic data editing frame to allow a user to create graphics data in a graphics design. The graphics data editing frame may be provided by the graphics data editor 124 of FIG. 1. The graphics design application may receive 704 an indication of a brush tool, such as a pixel brush tool. For example, a user may select with a suitable input device a pixel brush tool indicator such as pixel brush tool indicator 214 of FIG. 2 which may be provided by the graphics data editor 124 and displayed to the user by the display generator 130 of FIG. 1.

The graphics design application may determine 706 a first brush component defined by one or more brush component properties. In one example, the brush component module 126 of FIG. 1, in response to the indication of the brush tool, may automatically determine the first brush component based on default brush component properties which may be stored in the data store 122 of FIG. 1. The graphics design application may receive 708 an indication of modification of one or more of the first brush component properties such as from any suitable user input device 114 interacting with any displayed one or more user interface devices, which may be provided by the graphics data editor 124 and displayed to the user through the display generator 130 and the output device 116 of FIG. 1. For example, the user may be provided a brush component property dialogue box such as that shown in FIG. 3, a brush component tool box such as the toolbox 408 shown in FIG. 4, and the like.

The graphics design application may receive 710 an indication of an additional (or second) brush component to be associated with the currently selected brush tool. The indication of an additional brush component may be any suitable indication such as an indication that the input device 144 of FIG. 1 has selected an additional brush component selector, and the like.

The graphics design application may determine 712 the one or more brush component properties of the additional brush component in any suitable manner. For example, the same or different default brush component properties may be retrieved from the data store 122 by the brush component module 126 of FIG. 1. The graphics application may receive an indication of modification of one or more of the second brush component properties such as from any suitable user input device 114 interacting with any displayed one or more user interface devices, which may be provided by the pixel editor 124 and displayed to the user through the display generator 130 and the output devices 116 of FIG. 1. Although FIG. 7 illustrates only two brush components, it is to be appreciated that operations 708-714 may be repeated and may be done in any appropriate order.

The graphics design application may determine 716 the interaction between the multiple brush component marks of the brush tool in any suitable manner. As noted above, the one or more interactions may be defined as any combination of interaction operations such as an ordering indicator, a brush merging indicator, a brush buffer indicator, a brush mask value property, group brush component indicators, and the like. In one example, the brush component module 126 of FIG. 1, in response to the indication of an additional brush component, may automatically determine the one or more interactions based on default brush interactions which may be stored in the data store 122 of FIG. 1. Additionally or alternatively, a user may create and/or modify the interactions between the brush components in any suitable manner, such as through a displayed user interface device. In one example, the multiple brush components may be associated with the indicated interactions in any suitable manner, such as the interaction engine of FIG. 1 may store the association in the data store 122 and/or memory 104.

The graphics design application may receive 718 an indication of a pen down event and receive 720 an indication of a trail (e.g., movement) of the brush tool in the displayed frame. In one example, the indication of the pen down event and trail may be from a user input device 114 of FIG. 1, such as when a user clicks and drags the cursor across the workspace. In another example, the indication of the pen down event and trail may be automatically provided by the graphics data editor 124 of FIG. 1 in accordance with a default trail which may be retrieved from the data store 122. The default trail may be used to display a sample brush stroke of the composite brush selected by the user. For example, with reference to the example display of FIG. 3, the brush component dialogue box 300 may provide a sample stroke 352 of that single brush component illustrating the effects of the brush component properties modified and/or selected for that brush component. Additionally or alternatively, the brush component box, such as brush component box 408 of FIG. 4, may illustrate a sample composite brush stroke 468 for the multiple brush components of the pixel brush tool. The sample brush stroke may be automatically updated in response to modifications to one or more of the brush component properties and/or brush component interactions.

The composite brush mark as a merged combination of the multiple brush component marks may be determined 722 in any suitable manner. For example, the interaction engine 128 of FIG. 1 may receive (including retrieve from memory) the brush component mark properties and the associated brush component interaction operator(s) to form a composite brush mark based on the multiple brush component mark properties and brush component interaction operator(s). For example, the ordering indicator and/or group brush component indicator may be examined to determine the order of application of the different brush components. For each interaction between two or more brush component groups (where a group may contain one or more brush components), the brush merging indicator may be examined to determine the mode of merging operation, such as a union, an intersection, cut away, etc. of the brush component marks and the brush buffer indicator may be examined to determine if the array of marks to be examined for merger (e.g., stamp by stamp in single buffer brushing or over an entire trail in multi-buffer brushing). The merging of brush component groups may move up the ordered hierarchy of the multiple brush components until a composite brush is defined.

In response to the pen down event and indication of a trail, one or more marks of the composite brush may be displayed 724 along the indicated trail. For example, the display generator 130 of FIG. 1 may communicate with the graphic data editor 124 to display the composite brush stroke marks to the user such as through the output device 116. It is to be appreciated that display 724 to the user may occur in substantially real-time as the user creates the trail. For example, in a single buffer mode, the composite brush may be determined prior to a pen up event or at each stamp along the trail since the composite stamp is applied at each mark of each stamp along the trail. Similarly, in multi-buffer mode, the composite brush may be determined prior to a pen up event by merging the partial trails created so far from each individual brush component.

The graphics design application may receive 726 an indication of a pen up event, defining the end of the single, indicated trail. As with the pen down event, the pen up event may be provided through a user input device and/or through a default stroke. As noted above, one or more values of the brush component property(ies) may be dynamic over the length of a trail, e.g., variable opacity, variable width, jitter, randomness, repetition, and the like. In this manner, the determination of the composite brush may be repeated for each stamp of the composite brush along the trail such as in single buffer brushing mode or the entire trails (or a portion of a trail) of each multiple brush component may be combined such as in multi-buffer brushing mode.

While the many embodiments of the invention have been illustrated and described, it will be appreciated that various changes can be made therein without departing from the spirit and scope of the invention. For example, the multiple brush component technique can also be employed in the rendering of vector graphics with multiple sets of rendering attributes (e.g., fill, stroke, etc.). In such a case, the vector object may be rendered multiple times, one per each set of rendering attributes, and the resulting graphics or set of marks may be merged together using the specified merging operators.

The invention claimed is:

1. A method executing on at least one processor configured to perform the method, the method comprising:
receiving an indication of a graphics data brush tool in a graphics design application, the graphics design application is stored in a storage device;
determining a first brush component of the graphics data brush tool having one or more first brush component properties;
determining a second brush component of the graphics data brush tool having one or more second brush component properties, at least one value of the second brush component properties being different from a corresponding value of the first brush component properties;
determining a first ordering indicator indicating a first order of application between the first brush component and at least the second brush component, the first ordering indicator including a brush component group indicator grouping at least the first and second brush components as a first group composite, the first group composite having first group composite properties based at least in part on the first order of application, the at least one value of the second brush component property and the corresponding value of the first brush component property;
determining a third brush component of the graphics data brush tool having one or more third brush component properties, at least one value of the third brush component properties being different from a corresponding value of the first group composite properties;
determining a second ordering indicator indicating a second order of application between the first group composite and at least the third brush component;
determining a plurality of composite brush marks, each of the plurality of composite brush marks being based at least in part on the first brush component, the second brush component, the third brush component, the first order of application, the second order of application, the at least one value of the second brush component properties, and the at least one value of the third brush component properties; and
displaying a single brush stroke based on the plurality of composite brush marks, wherein at least one of the ordering indicators includes an indication of a hierarchy of the brush components.

2. The method of claim 1, wherein the second ordering indicator includes a second brush component group indicator grouping the first group composite and at least the third brush component as a second group composite.

3. The method of claim 1, wherein the first ordering indicator includes a displayed order of the first brush component and the second brush component in a displayed brush component list.

4. The method of claim 1, wherein determining the plurality of composite brush marks includes determining a composite stamp every time a stamp is to be stamped along the trail based at least in part on a spacing property of the first brush component and the second brush component.

5. The method of claim 1, wherein determining the plurality of composite brush marks includes applying the first brush components along at least a portion of the trail as a first trail, applying the second brush component along at least a portion of the trail as a second trail, and merging the first and second trails.

6. The method of claim 1, wherein at least one of the ordering indicators includes a displayed indication of a hierarchy of interaction operators.

7. The method of claim 1, wherein at least one of the ordering indicators includes a displayed indication of the timing of the application of interaction between the different brush components.

8. The method of claim 1, wherein the at least one value of the second brush component properties comprises paint thickness.

9. The method of claim 1, wherein the at least one value of the first brush component properties comprises reflectivity.

10. A computer program product comprising:
software instructions for enabling a computer to perform predetermined operations; and
one or more computer storage media having the software instructions, the predetermined operations including:
receiving an indication of a graphics data brush tool in a graphics design application;

determining a first brush component of the graphics data brush tool having one or more first brush component properties;

determining a second brush component of the graphics data brush tool having one or more second brush properties, at least one value of the second brush component properties being different from a corresponding value of the first brush component properties;

determining a first ordering indicator indicating a first order of application between the first brush component and at least the second brush component, the first ordering indicator including a brush component group indicator grouping at least the first and second brush components as a first group composite, the first group composite having first group composite properties based at least in part on the first order of application, the at least one value of the second brush component property and the corresponding value of the first brush component property;

determining a third brush component of the graphics data brush tool having one or more third brush component properties, at least one value of the third brush component properties being different from a corresponding value of the first group composite properties;

determining a second ordering indicator indicating a second order of application between the first group composite and at least the third brush component;

determining a plurality of composite brush marks, each of the plurality of composite brush marks based at least in part on the first brush component, the second brush component, the first group composite, the third brush component, the first order of application, the second order of application, the at least one value of the second brush component properties, and the at least one value of the third brush component properties; and displaying a single brush stroke based on the plurality of composite brush marks, wherein at least one of the ordering indicators include an indication of a hierarchy of the brush components.

11. The computer program product of claim 10, wherein the second ordering indicator includes a second brush component group indicator grouping the first group composite and at least the third brush component as a second group composite.

12. The computer program product of claim 10, wherein the first ordering indicator includes a displayed order of the first brush component and the second brush component in a displayed brush component list.

13. The computer program product of claim 12, wherein at least one of the ordering indicators includes an indication of a hierarchy of brush components.

14. The computer program product of claim 10, wherein determining the plurality of composite brush marks includes determining a composite stamp every time a stamp is to be stamped along the trail based at least in part on a spacing property of the first brush component and the second brush component.

15. The computer program product of claim 10, wherein determining the plurality of composite brush marks includes applying the first brush components along at least a portion of the trail as a first trail, applying the second brush component along at least a portion of the trail as a second trail, and merging the first and second trails.

16. The computer program product of claim 10, wherein at least one of the ordering indicators includes a displayed indication of a hierarchy of brush merging operations.

17. The computer program product of claim 10, wherein at least one of the ordering indicators includes a displayed indication of the timing of the application of interaction between the different brush components.

18. The computer program product of claim 10, wherein the at least one value of the second brush properties is selected from the group consisting of paint thickness and reflectivity.

* * * * *